BI-POLAR PHASE DETECTOR AND CORRECTOR FOR SPLIT PHASE PCM DATA SIGNALS
Filed Sept. 30, 1966

INVENTORS
James W. Bailey
Donald F. McAfee &
Louis A. Koschmeder
BY
ATTORNEYS 3,491,202

BI-POLAR PHASE DETECTOR AND CORRECTOR FOR SPLIT PHASE PCM DATA SIGNALS

James W. Bailey, 6909 100th Ave., Seabrook, Md. 20801; Louis A. Koschmeder, 8121 Gavin St., Hyattsville, Md. 20784; and Donald F. McAfee, Rte. 1, Box 95D, Annapolis, Md. 21401

Filed Sept. 30, 1966, Ser. No. 584,067
Int. Cl. H04l *15/24, 17/16, 15/00*
U.S. Cl. 178—88 9 Claims

ABSTRACT OF THE DISCLOSURE

A regenerator for providing an established phase to a received split phase PCM data train. The data train is sent through a shift register having the same number of registers as bits in the sync word of the data. The shift register is continuously interrogated in parallel to provide pulse output whenever the complement of the desired phase of the sync word is detected. Receipt of the sync word in complemented format is indicative of a 180 degree phase shift. Accordingly, this pulse output is caused to switch a gate which ultimately provides for a 180 degree phase shift in the received data.

Figures 1, 2:
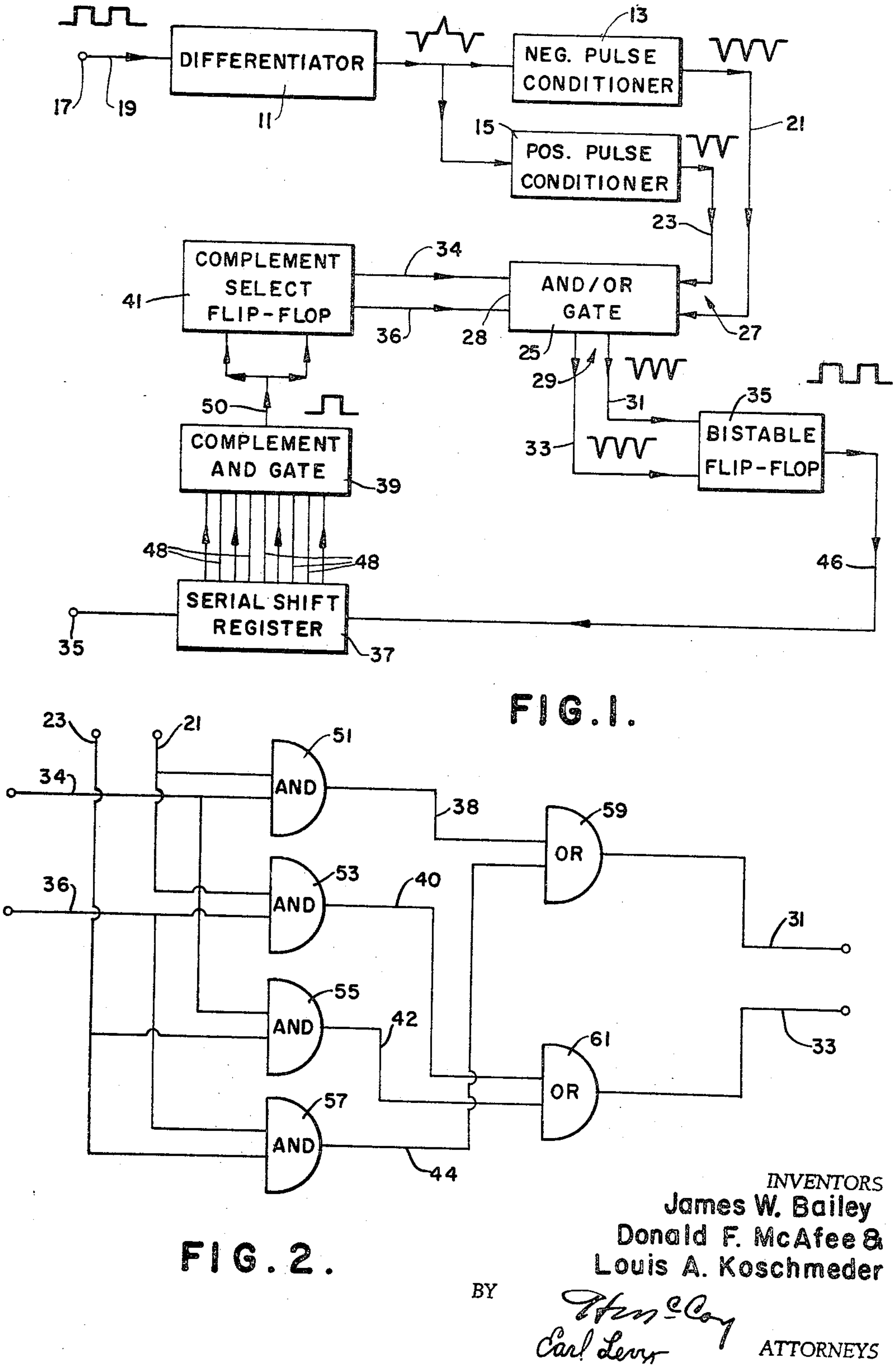

The invention described herein was made by employees of the United States Government and may be manufactured and used by or for the government for governmental purposes without the payment of any royalties thereon or therefor.

The invention relates to pulse code modulation (PCM) and more particularly to the phasing of a PCM decoder with an incoming PCM signal. PCM systems are widely used to communicate information over long ranges. Information or data, as it is more commonly known, is encoded at the transmitting point into a bilevel signal of a particular frequency (bit rate). This signal is transmitted over a transmission media to a receiver whose output is decoded to reproduce the original data. PCM systems have the advantage of operation at a very low signal to noise level. Specificaly, the data contained in a PCM signal is determined by the general level of the signal and it is sampled at the frequency of the signal; it does not depend on the specific height of the signal. Therefore, the addition of noise to the signal does not create errors as it would with other types of amplitude modulation systems. This advantage allows a PCM system to operate at very low signal levels. The only restriction is that the signal level must be greater than the noise level. And, even this restriction has been somewhat reduced by recently developed systems. These systems provide a statistical approach to obtaining information from very low level PCM systems.

The prior art has developed various types of PCM code formats. If a voltage of one level is detected one type of output occurs and if a voltage of another level is detected a second type of output occurs. That is, a "1" or a "0" is generated depending upon the level of the signal. Other formats depend upon the rising or dropping of the voltage from one level to another during the sample period. This latter system is known as a split phase PCM format. For example, if a voltage during the sample period rises from a zero to a plus voltage condition a "1" may be represented. Conversely, if the voltage drops from a plus voltage condition to zero a "0" may be represented.

Because of their ability to operate at low signal levels PCM systems have found wide use in communicating between space vehicles and earth based receiving stations. However, their use is not limited to transmitting from space to earth. PCM systems are of more general applicability; they may be used with high level as well as low level signals. But, their particular characteristic of being free from noise interference at very low signal levels makes them readily adaptable to low power transmission systems.

While PCM systems have certain advantages they also pose some problems. For the "1's" and the "0's" or bits (as they are more commonly known) to have meaning there must be synchronization between the incoming signal and the decoder. Specifically, a defined group of bits is called a word and each word possesses a certain amount of data. However, for words to have their proper meaning their starting and stopping points must be known. To provide this synchronization a PCM message contains periodic synchronization signals, or words, in a particular code. This code is used to synchronize the decoder with the incoming signal. The synchronizing code usually consists of a preselected pseudo random pattern of ones and zeros. To accomplish synchronization generally requires a solution to the problem of phasing the input signal with the decoder. That is, particularly with respect to split phase PCM data, if the incoming signal is shifted from its desired position by 180° the detected information would be an error. For example, if a word of the input data reads 111001001 and the word is shifted 180°, with respect to the fundamental reference phase of the data train, the incoming word would appear to read 000110110. Hence, this 180° phase shift has inverted the data and disguises its true meaning. It is this 180° phase shift with which the invention is particularly concerned.

The prior art has attempted to solve the phasing problem in two ways. The first way is to design a system for the particular PCM signal to be received. However, this type of device is limited to the particular system with which it is to be used. The second way has been to provide an indication of when the incoming signal is out of phase with the receiver. An operator then flips a switch to invert the incoming signals so that it will be fed into the system's registers in the appropriate phase. This latter system is undersirable because it either requires a continuous monitoring of the incoming PCM signal or it allows for the possibility of large data losses when the inverted signal is received and not immediately inverted.

Therefore, it is an object of this invention to provide an apparatus for automatically shifting the phase of an incoming PCM signal when it is out of phase with the PCM data decoder.

It is a further object of this invention to provide an apparatus for detecting the phase of an incoming PCM signal and for shifting said incoming signal 180° when it is 180° out of phase with the receiver receiving said signal.

In accordance with the principle of the invention, the incoming PCM data train is operated upon so that the synchronization code words in the incoming signal are identifiable, thereby enabling the receiver to be synchronized thereto. A synchronization code word, or sync code, is generally a word which is repeated periodically and which has a characteristic which distinguishes it from all other words of a PCM data train, i.e., the synchronization code word may be an arbitrarily chosen word having a larger number of bits than other words and having some arbitrarily chosen sequence of bits. More specifically, the incoming PCM signal is applied to a conditioning means. The conditioning means generates two unipolar output pulse chains. The pulses on one chain are timed with each rise of the input PCM signal; that is, each time the PCM signal rises from its lower level to its upper level a pulse occurs. The pulses on the other chain are timed with each fall of the input PCM signal; that is, each time the PCM signal falls from its upper level to its lower level a pulse occurs. Hence, the pulses on the outputs occur at alternate times.

The pair of pulse chains are applied to a gate means. The gate means receives the pair of pulse chains and provides a means for switching them between a pair of dual output lines. Specifically, the gate means will selectively apply one chain of conditioned pulses to one of its pair of dual output lines and the other chain of condition pulses to the other of its pair of output lines. Which set of pulses is on each output line is dependent on the setting of the gate.

The gate is set by a control means. The control means is connected to the dual outputs of the gate means and is adapted to detect the complement of the sync code. This complement occurs when the input signal is 180° out of phase with the decoder. When this condition is detected the control means causes the gate means to switch its dual output lines. That is, what was formerly on one output line is now on the other and vice versa. Since these dual outputs contain the input data in pulse form, the switching of these outputs shifts the data 180°. Because the data has been shifted 180° (if it was out of phase) the signal is now in phase with the decoder. However, if the input data had been in phase the complement of the sync code would not have been detected and no phase shift would have occurred.

It will be appreciated that the foregoing is a simple device for correcting the phase of an incoming PCM signal. Specifically, the incoming PCM synchronizing code is detected for an out-of-phase condition. An out-of-phase condition causes a corrective action which, in effect, causes an inversion of the input data signals to bring them into phase with the decoder.

The foregoing objects and many of the attendant advantages of this invention will become more readily appreciated as the same becomes better understood by reference to the following detailed description when taken in conjunction with the accompanying drawings wherein:

FIG. 1 is a block diagram of a preferred embodiment of the overall system of the invention; and FIG. 2 is a block diagram of the AND/OR gate illustrated in FIG. 1.

The block diagram illustrated in FIG. 1 comprises a conditioning means, a gate means, and a control means.

The conditioning means comprises a differentiator 11, a negative pulse conditioner 13, and a positive pulse conditioner 15. The incoming PCM data is received at an input terminal 17. This input terminal is connected by a line 19 to the input of the differentiator 11. The differentiator differentiates the incoming bilevel signal and generates a series of bi-polar pulses. That is, the output from the differentiator is a series of alternate positive and negative pulses. These pulses are created whenever the incoming signal rises or falls, i.e. changes from one bilevel state to the other bilevel state. For example, consider the incoming PCM signal as a split phase signal reading 10001; during the first period a pulse in one direction would occur since there is a bilevel change. During the second period a pulse in the opposite direction would occur since there is a bilevel change in the opposite direction. During the next period there would be pulses in both directions. The same is true for the fourth period. However, during the fifth period there would be a single level change which would generate a pulse similar to that generated during the first period. Hence, an alternate series of pulses would have occurred. However, they are not in a particularly sequential regulated order as they would be for a symmetrical code of 101010. Normally data would not occur in this specific code and this is one reason why it may be used for synchronization purposes.

The output from the differentiator is fed to the inputs of both the negative pulse conditioner 13 and the positive pulse conditioner 15. The negative pulse conditioner amplifies the negative pulses; the positive pulse conditioner 15 amplifies an inverts the positive pulses. The output from the negative pulse conditioner is a series of negative pulses that pass along a line 21. The output from the positive pulse conditioner is also a series of negative pulses; these pulses pass along a line 23. Hence, the outputs on both lines are a series of amplified negative pulses. These pulses are alternately timed. That is, a pulse may be on line 21 followed by a pulse on line 23. In time this pulse is followed by a pulse on line 21.

The gate means of the invention comprises an AND/OR gate 25. The lines 21 and 23 from the positive and negative pulse conditioners represent a first pair of inputs 27 to the AND/OR gate 25. The AND/OR gate has a pair of outputs 29. The AND/OR gate is adapted to pass the signals at its first pair of inputs 27 to its outputs 29. However, which input signal is applied to which output is determined by the setting of the gate. The gate is set in accordance with a pair of inputs from the control means as hereinafter described. Those inputs are applied at a second pair of input terminals 28.

To more fully understand the operation of the AND/OR gate reference is now made to FIG. 2; FIG. 2 illustrates a block diagram of a preferred embodiment of an AND/OR gate that operates in the desired manner. The AND/OR gate of FIG. 2 comprises four AND gates 51, 53, 55 and 57 and two OR gates 59 and 61. The input from the negative pulse conditioner 13 on line 21 is supplied to the first and second AND gates 51 and 53; and the input from the positive pulse conditioner 15 on line 23 is applied to the second and third AND gates 55 and 57. A first input from the control means is designated as a line 34 and is applied to the second and third AND gates 51 and 55; the second input from the control means is designated as a line 36 and is applied to the second and fourth AND gates 53 and 57. The output from the first AND gate 51 is on a line 38 and is applied to one input of the first OR gate 59. The output from the second AND gate is on a line 40 and applied to one input of the second OR gate 61. The output from the third AND gate 55 is on a line 42 and is applied to the second OR gate 61. Finally, the output from the fourth AND gate 57 is on a line 44 and is applied to the first OR gate 59. The output from the first OR gate is a line 31 and the output from the second OR gate is a line 33.

For descriptive purposes the AND and OR gates are designated as negative AND and negative OR gates. That is, dual negative signals on the input to the AND gates creates a negative output signal. Similarly, a negative input singal to one of the OR gates creates a negative output signal. Hence, when line 34 is negative and line 21 is negative, AND gate 51 generates a negative output which passes through the first OR gate and creates a negative signal on line 31. For ease of understanding the entire operation of the gates the following table is presented:

| Input Lines | | | | And Output Lines | | | | Or Output Lines | |
|---|---|---|---|---|---|---|---|---|---|
| 23 | 21 | 34 | 36 | 38 | 40 | 42 | 44 | 31 | 33 |
| 0 | −1 | −1 | 0 | −1 | 0 | 0 | 0 | −1 | 0 |
| 0 | −1 | 0 | −1 | 0 | −1 | 0 | 0 | 0 | −1 |
| −1 | 0 | −1 | 0 | 0 | 0 | −1 | 0 | 0 | −1 |
| −1 | 0 | 0 | −1 | 0 | 0 | 0 | −1 | −1 | 0 |

In the foregoing table the −1's represent negative signals and the 0's represent zero inputs. Taking the initial condition that a negative signal is on line 21, a negative signal is on line 34, and the remainder of the inputs are zero; the first AND gate 51 generates a negative output one line 38 which triggers the first OR gate 59 to provide a negative output on line 31. However, if line 36 has the negative signal and line 34 does not, the second AND gate 53 generates the negative output signal on line 40. This signal would trigger the second OR gate 61 to provide a negative signal on line 33. Hence, in the case where a negative signal appears on line 21 whether it reappears on line 31 or 33 depends upon which of the lines 34 or 36 is negatively energized.

In a similar manner, if a negative signal is on line 23 and line 34 is negatively energized the third AND gate generates an output. This output triggers the second OR gate 61 to provide a negative signal on line 33. However if line 36 and line 23 are negatively energized the fourth AND gate is triggered which in turn triggers the first OR gate. The first OR gate then generates a negative signal on line 31.

From the foregoing it will be appreciated that the AND/OR gate illustrated in FIG. 2 is a switching circuit which switches the inputs on lines 21 and 23 to lines 31 or 33 in accordance with whether the signal is on either line 34 or line 36. Specifically, the control input lines 34 and 36 control the 180° phase shift between the inputs to the AND/OR gate from the pulse conditioners and the outputs from the AND/OR gate. Consequently, as hereinafter described when the control means detects a 180° out-of-phase condition it switches a signal from line 34 to 36 or vice versa thereby switching the outputs from the AND/OR gate. Hence, a 180° phase shift of the incoming data is created. In this manner the input data is inverted to put it back into phase with the receiver.

The AND gates illustrated in FIG. 2 are conventional and well known in the art. For example, they could comprise a pair of diodes in parallel relationship with one end of each diode connected to one of the illustrated inputs. The other end of the diodes could be coupled together and applied to the OR gate. The OR gates are also of a conventional nature and could be diode OR gates, for example. A pair of parallel diodes having one end connected to the AND gate outputs and the other ends connected together and to an output line will provide the appropriate output signal. The poling direction of the gates is dependent upon the positiveness or negativeness of the input signal as well as where an AND or OR function is to be created. Since all of the inputs have been designated as negative the gates must be poled negative. However, a reversal to a positive input condition for all of the signals would require that the gates be poled positive.

Returning now to the description of the operation of FIG. 1, the control means of the invention comprises a bistable flip-flop 35, a serial shift register 37, a complement AND gate 39, and a complement select flip-flop 41. The output lines 31 and 33 from the AND/OR gate are connected to the inputs of the bistable flip-flop. These signals are adapted to alternately switch the flip-flop from its set to its reset condition. That is, a signal on one line will set the flip-flop and a signal on the other line will reset the flip-flop. An output line 46 is connected to one side of the flip-flop and a bilevel signal passes down it. Specifically, this signal is a regeneration of the original input data. This is easily understood because the pulses flowing to the AND/OR gate are a pulse representation of the input data. In this manner the bistable flip-flop is alternately switched from one state to the other; this switching regenerates the input data. The data on line 46 is fed into the serial shift register 37. In a normal manner the data is shifted through the shift register 37 and appears as an output at an output terminal 35. Terminal 35 is connected to the data receiver's other electronic system (not shown) for further processing. Hence, all that has occurred from the input terminal 17 to the output terminal 35 is that the data has been changed from bilevel form to pulse form and then back into bilevel form. There has been no change in the actual content of the data; however, as hereinafter described the data may have been shifted 180° to bring it into phase with the decoder.

In addition to the signal output 35, the shift register 37 also has a plurality of outputs 48. These outputs are from the individual stages of the register and are connected to the inputs of the complement AND gate 39 which functions to generate an output when a certain predetermined PCM code is contained in the register. By making this code the complement of the desired phasing signal the complement AND gate generates an output when a 180° phase shift occurs.

If the shift register 37 is, for example, a series of bistable multivibrators each multivibrator will have a set and a reset side. The set side will be connected from each stage to the next stage so that the data can be serially shifted through the register. This set connection would be the in phase connection. However, each stage of the register also has a reset side. This reset side represents the complement of the set side, i.e. if the set side registers a 1 the reset side registers a 0. Further, if the signal is 180° out of phase the reset and set sides will be inverted from their desired condition. Hence, by taking the plural outputs from the complement side and connecting them to the complement AND gate 39 along the parallel lines 48 a multiple input to the complement AND gate 39 is provided when a complement condition is in all of the stages of the register. The complement AND gate 39 will then generate an output on line 50. for example, if a 27 bit synchronizing code consisting of alternate ones and zeroes is used and the shift register is a 27 stage register all of the inputs to the complement AND gate will only be energized for the short period of time that the complement bits are all in the serial register together. The complement AND gate will only generate one pulse. This pulse is applied to the complement select flip-flop 41 and in a conventional manner flips that flip-flop. This flipping changes the output on the lines 34 and 36. Specifically, if previously line 34 was energized line 36 will now be energized. It will be appreciated from the foregoing description that this flipping will cause a shift in the output on lines 31 and 33. Hence, a 180° phase shift will have been made.

In the foregoing manner a corrective phase shift is obtained when a PCM input signal is out-of-phase with the receiver. By the use of a 27 bit synchronizing code word the statistical possibility of a data signal being exactly the same is very small. Therefore, the possibility of a phase shift from a correct phase to an out-of-phase condition is also very small. Even if this occurs the next synchronizing signal code shifts the receiver back into phase. Consequently, if any data loss occurs it will be very limited. However, it should be noted that the use of a 27 bit synchronizing code is only by way of example and that any code suitable for use in a PCM system can be used. All that is important is that the code be adapted to give a complement indication when an out-of-phase condition has occurred.

It will be appreciated that the foregoing has described a simple device for phasing a PCM decoder. This is, when the synchronizing signal portion of a PCM signal reaches the register, after passing through the differentiator, the positive and negative pulse conditioners, the AND/OR gate, and the bistable flip-flop, the sync signal generates an output along the parallel output lines of each register stage only if the sync signal is out of phase. If the sync signal is in phase no output will be generated on the register's output lines. However, if the input sync signal is out-of-phase all of the inputs to the complement AND gate are energized which causes the complement AND gate to generate an output. This output triggers the complement selected flip-flop which then changes its outputs from one state to the opposite state. This change will cause an inversion of the outputs from the AND/OR gate so that this inverted signal is in phase with the receiver.

While the foregoing has described a preferred embodiment of the invention it will be appreciated by those skilled in the art that numerous changes may be made within the scope of the invention. For example, the means of recognizing an out-of-phase condition has been described as a register in conjunction with an AND gate. However, other means of performing this function exist. For example, the input synchronizing pulses could be compared in time with an internally generated signal. If the comparison indicated that an out-of-phase condition had occurred a signal would be applied to a complement selected flip-flop which would change the phase of the input data in the manner herein described. Or, the synchronizing input pulses could be added together to obtain a total. If this total indicated that an out-of-phase condition had occurred, a signal would be applied to the complement select flip-flop which would again invert the data in the manner herein described. Hence, the invention may be practiced otherwise than as specifically described herein.

What is claimed is:

1. Apparatus for providing an established phase of a split phase PCM signal to ensure that said signal is a true representation of an incoming PCM signal, said apparatus comprising:

conditioning means for receiving said incoming PCM signal and generating a pair of pulse chain outputs, the pulses of one chain occuring at each rise of said incoming PCM signal and the pulses of the other chain occuring at each fall of said incoming PCM signal;

gate means having a first and second input for receiving said pair of pulse chain outputs of said conditioning means and having dual outputs for passing said first and second inputs, said gate means including means for switching each said first and second input from one dual output to the other dual output; and control means, said control means connected to the dual outputs of said gate means for regenerating said split phase signal and for correcting the phase of said regenerated split phase signal when said regenerated signal is 180 degrees out of phase with said established phase, said control means being connected to said means for switching to cause said gate means to change outputs when said regenerated split phase signal is 180 degrees out of said established phase, said control means further comprising an output terminal, said output terminal being adapted to pass said regenerated split phase signal.

2. Apparatus as claimed in claim 1 wherein said conditioning means includes a differentiator for receiving said PCM signal and differentiating said signal to provide positive and negative pulse outputs.

3. Apparatus as claimed in claim 2 wherein said conditioning means includes:

a positive pulse conditioner for receiving the positive pulse output from said differentiator for inverting and amplifying said positive pulse output; and a negative pulse conditioner for receiving the negative pulse output from said differentiator and amplifying said negative pulse output.

4. Apparatus as claimed in claim 3 wherein said gate means comprises:

an AND/OR gate having four inputs and two outputs, said first and second of said inputs adapted to receive the dual outputs from said positive and negative pulse conditioning means;

a third and fourth inputs, said third and fuorth inputs adapted to receive the input from said control means; and said two outputs being said dual outputs adapted to pass said inputs from said positive and negative pulse conditioning means.

5. Apparatus as claimed in claim 4 wherein said control means includes a bistable flip-flop, the inputs to said bistable flip-flop connected to said dual outputs of said AND/OR gate.

6. Apparatus as claimed in claim 5 wherein said control means includes a register adapted to receive an output from said bistable flip-flop, said register having individual stages.

7. Apparatus as claimed in claim 6 wherein said control means also includes an AND gate, the inputs to said AND gate connected to the outputs of the said individual stages of said register, said AND gate means adapted to generate an output when said register is in a predetermined condition.

8. Apparatus as claimed in claim 7 wherein said control means includes a complement select flip-flop having dual inputs both connected to the output from said complement AND gate and adapted to generate dual outputs, the dual outputs from said complement select flip-flop connected to said third and fourth inputs of said AND/OR gate for controlling the switching of said AND/OR gate.

9. Apparatus as claimed in claim 8 wherein said AND/OR gate comprises:

four AND gates and two OR gates;

one output from said complement select flip-flop connected to the first and third AND gates;

the second output from said complement select flip-flop connected to said second and fourth AND gates;

one output of said complement select flip-flop connected to said first and second AND gates;

the other output of said complement select flip-flop connected to the third and fourth AND gates;

the outputs from said first and fourth AND gates connected to the first OR gates; and the outputs from said second and third AND gates connected to the second OR gate, with the pair of outputs from said OR gates forming said AND/OR gate dual output.

References Cited

UNITED STATES PATENTS

| | | | |
|---|---|---|---|
| 3,144,608 | 8/1964 | Warring | 325—30 |
| 3,156,893 | 11/1964 | Harel | 178—67 |

ROBERT L. GRIFFIN, Primary Examiner

JAMES A. BRODSKY, Assistant Examiner

U.S. Cl. X.R.

178—68; 325—38, 323